US011272006B2

(12) United States Patent
Saad et al.

(10) Patent No.: US 11,272,006 B2
(45) Date of Patent: Mar. 8, 2022

(54) INTELLIGENTLY DISTRIBUTING RETRIEVAL OF RECOVERY DATA AMONGST PEER-BASED AND CLOUD-BASED STORAGE SOURCES

(71) Applicant: EMC IP Holding Company LLC, Hopkinton, MA (US)

(72) Inventors: Yossef Saad, Ganei Tivka (IL); Alex Solan, Hertzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/891,374

(22) Filed: Jun. 3, 2020

(65) Prior Publication Data
US 2021/0385275 A1 Dec. 9, 2021

(51) Int. Cl.
*H04L 29/08* (2006.01)
*H04L 67/1097* (2022.01)
*H04L 67/104* (2022.01)

(52) U.S. Cl.
CPC ........ *H04L 67/1097* (2013.01); *H04L 67/104* (2013.01)

(58) Field of Classification Search
CPC ............ G06F 11/1451; G06F 11/1458; G06F 11/1469; G06F 2201/81; H04L 67/1095; H04L 67/1097
See application file for complete search history.

(56) References Cited

U.S. PATENT DOCUMENTS

| | | | | |
|---|---|---|---|---|
| 8,447,801 | B1* | 5/2013 | Roche | H04L 67/306 709/201 |
| 8,553,596 | B1* | 10/2013 | Vivanco | H04L 67/1072 370/310 |
| 9,100,709 | B1* | 8/2015 | Osminer | H04N 21/466 |
| 10,210,054 | B1* | 2/2019 | Mehrotra | G06F 11/2094 |
| 10,904,596 | B2* | 1/2021 | Major | H04L 25/03184 |
| 2010/0094833 | A1* | 4/2010 | Svendsen | G06F 16/48 707/705 |
| 2011/0010258 | A1* | 1/2011 | Chavez | G06Q 30/0283 705/26.1 |
| 2011/0099263 | A1* | 4/2011 | Patil | H04N 21/4532 709/224 |
| 2014/0310246 | A1* | 10/2014 | Vijayan | G06F 11/1464 707/679 |

(Continued)

*Primary Examiner* — Shean Tokuta
(74) *Attorney, Agent, or Firm* — Dergosits & Noah LLP; Todd A. Noah

(57) ABSTRACT

Described is a system for intelligently distributing the retrieval of recovery data amongst peer-based and cloud-based storage sources. The system may leverage a peer network by performing a recovery from a combination of sources including peer devices and a cloud-based storage by considering a multitude of factors. For example, the system may consider retrieval information (e.g. availability, performance metrics, retrieval costs, etc.) associated with each of the potential sources in combination with target information (e.g. recovery objectives, file recovery priorities, etc.) to create an ordering preference (e.g. ranking) for sources from which to retrieve recovery data. The system may rank the sources by determining a specialized recovery score for each source thereby allowing the intelligent retrieval of recovery data.

21 Claims, 4 Drawing Sheets

(56) References Cited

U.S. PATENT DOCUMENTS

| | | | | |
|---|---|---|---|---|
| 2015/0006957 A1* | 1/2015 | Ginzinger | ............... | G06F 3/067 |
| | | | | 714/15 |
| 2015/0113548 A1* | 4/2015 | Stern | .................... | H04N 21/252 |
| | | | | 725/9 |
| 2015/0113554 A1* | 4/2015 | Stern | .................. | H04N 21/4325 |
| | | | | 725/32 |
| 2015/0193312 A1* | 7/2015 | Nanivadekar | ....... | G06F 11/1458 |
| | | | | 707/654 |
| 2017/0195416 A1* | 7/2017 | Swanson | ............. | H04L 67/1095 |
| 2018/0060180 A1* | 3/2018 | Tan | ..................... | G06F 11/1464 |
| 2019/0310920 A1* | 10/2019 | Rybczyk | ................. | G06N 7/005 |
| 2020/0057567 A1* | 2/2020 | Hutcheson | ............ | G06F 9/4401 |
| 2020/0327017 A1* | 10/2020 | Vijayan | ............... | G06F 11/1469 |
| 2020/0410066 A1* | 12/2020 | Maughan | ................ | G06F 21/10 |
| 2020/0410418 A1* | 12/2020 | Martynov | ........ | G06Q 10/06312 |
| 2020/0413115 A1* | 12/2020 | Major | ................ | H04N 21/4383 |

\* cited by examiner

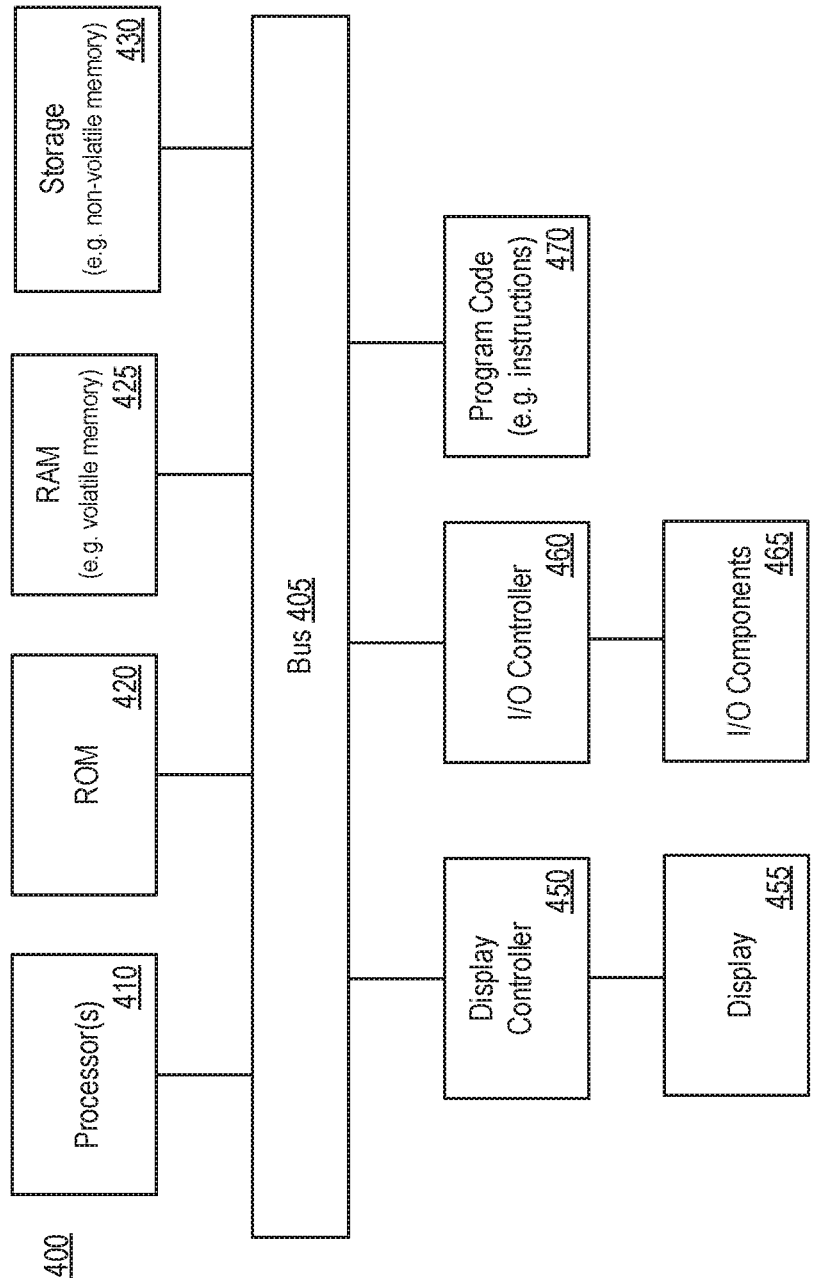

INTELLIGENTLY DISTRIBUTING RETRIEVAL OF RECOVERY DATA AMONGST PEER-BASED AND CLOUD-BASED STORAGE SOURCES

TECHNICAL FIELD

This disclosure relates to data backup systems, and more particularly, selecting particular storage sources from which to retrieve recovery data.

BACKGROUND

Users of personal computing devices such as desktop or laptop devices often use cloud-based backup services delivered as a "Software-as-a-Service" (SaaS). More particularly, these backup services are typically referred to as "Backup-as-a-Service" (BaaS). When storing backup data, these backup services often store backup files on a cloud-based storage, which may be provided by a third-party storage provider. Accordingly, the storage solution may not be optimized for storage costs that may be incurred by the BaaS provider or the user. For example, when files are stored on a particular cloud-based storage tier, the same costs may be incurred to store each backup file irrespective of the access requirements associated with the individual backup files. Moreover, groups of related computing devices that utilize these backup services may often share a certain amount data. For example, computing devices of a particular organization may share a certain number of files, and therefore, the cloud-based storage may not be the only source for recovery data. Accordingly, there exists a potential for backup services (or BaaS) platforms to efficiently recovery files without necessarily relying solely on a cloud-based storage source.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 4 is a block diagram illustrating an example computing system that may be used in conjunction with one or more embodiments of the disclosure.

DETAILED DESCRIPTION

Figure 1:
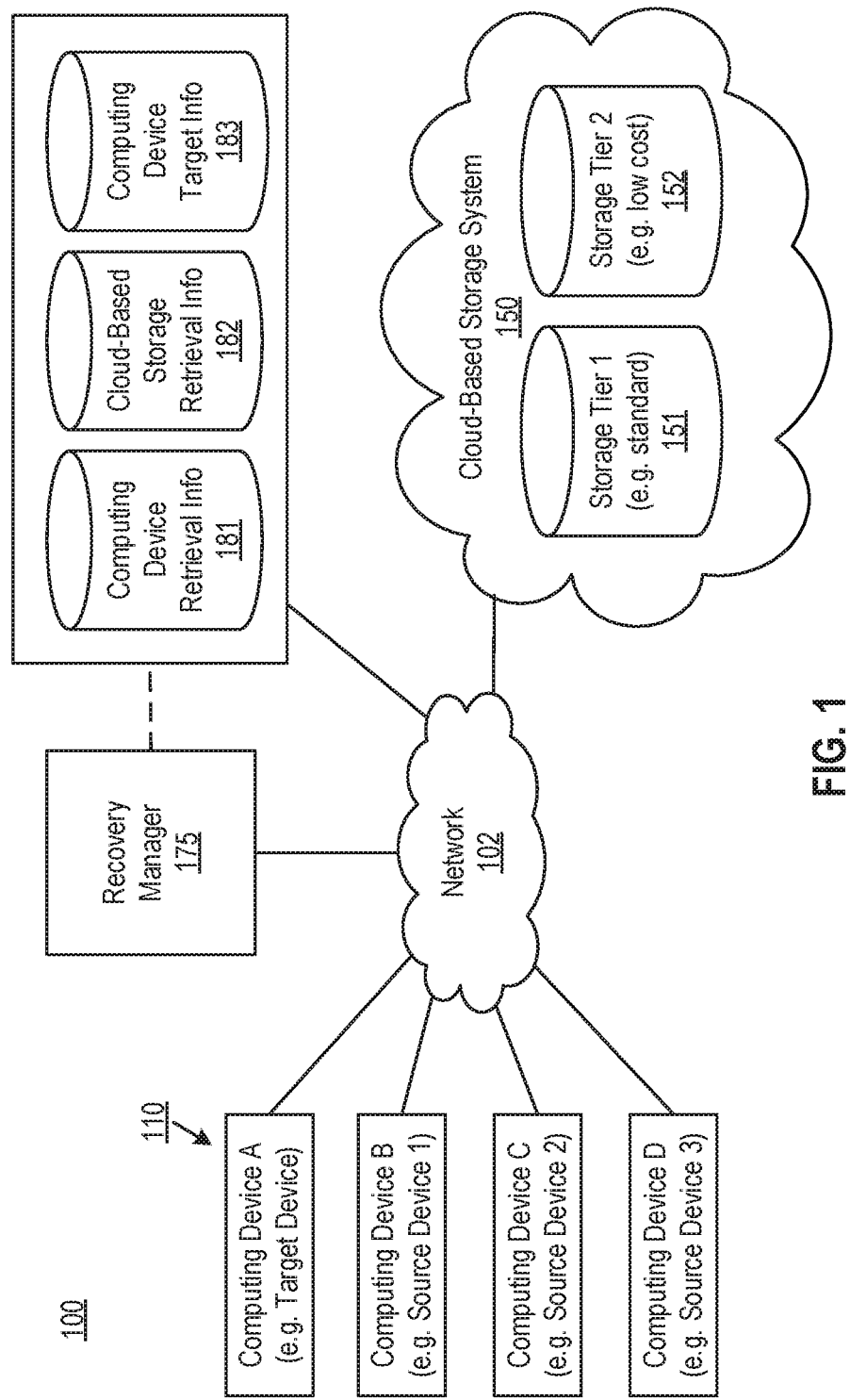
FIG. 1 is a block diagram illustrating an example operating environment for distributing the retrieval of recovery data amongst multiple storage source types according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for intelligently distributing the retrieval of recovery data amongst peer-based and cloud-based storage sources. For example, one or more related computing devices (e.g. personal computing devices) may subscribe to a backup service (e.g. backup-as-a-service (BaaS)) that provides the ability to recover files in the event of data loss. As part of a backup process, the BaaS may store a set of files of a particular computing device to a cloud-based storage. However, the other related computing devices (or peer devices) may also store a copy of the file. For example, the peer devices may be associated with the same organization and/or be part of the same private network, and thus, there is a likelihood that peer devices share a certain number of files. Accordingly, the system may leverage such a peer network by performing a recovery from a combination of sources including peer devices and a cloud-based storage. Moreover, the system may intelligently distribute the retrieval of recovery data by considering a multitude of factors. For example, the system may consider retrieval information (e.g. availability, performance metrics, retrieval costs, etc.) associated with each of the potential sources in combination with target information (e.g. recovery objectives, file recovery priorities, etc.) to create an ordering preference (e.g. ranking) for sources from which to retrieve recovery data. In some embodiments, the system may rank the sources by determining a specialized retrieval score for each of the storage sources. Accordingly, the system may use such rankings to perform an intelligent retrieval of recovery data. Moreover, the system may implement a certain degree of parallelism to further improve the efficiency of the retrieval. For example, the system may send retrieval requests concurrently to the peer devices, and retrieve data from the devices that accept the request according to the determined rankings. In addition, when retrieving the recovery data, the system may consider the resource consumption of particular sources, and perform any necessary load balancing. Accordingly, in some embodiments, the system provides a powerful mechanism for data protection services by intelligently automating the management of data retrieval for a recovery process.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and recovery (or backup) services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, at least some of the components of the operating environment may be provided within a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" or "file" is intended to be broad in scope. For example, data or files may include data objects (or objects), data segments such as may be produced by data stream segmentation processes, data chunks, data blocks, atomic data, emails, contacts, directories, sub-directories, volumes, etc. In addition, the storage of data can employ any suitable storage technique (e.g. file-based, block-based, object-based storage, etc.), infrastructure (e.g. cloud-based), or hardware (e.g. Solid State Drive (SSD), Hard Disk Drive (HDD), etc.).

More specifically, and with reference to FIG. 1, shown is a block diagram illustrating an example of an operating environment 100 for distributing the retrieval of recovery data amongst multiple storage source types according to one or more embodiments of the disclosure.

As shown, the environment 100 may include one or more computing device(s) 110, a cloud-based (or on-demand) storage system 150, and a recovery manager (or manager) 175, which may be associated with (e.g. stores and/or maintains) computing device retrieval information 181, cloud-based storage retrieval information 182, and computing device target information 183. The cloud-based storage system (or cloud-based storage) 150 may provide on-demand storage services (e.g. storage-as-a-service), which can be provided off-prem by a cloud services provider or on-prem and be operated by the same organization that owns the computing devices 110. In some embodiments, the provider of recovery services may be provided by a different entity than the entity that provides the cloud-based storage services (and the associated cloud-based storage system 150). In some embodiments, the cloud-based storage 150 may provide scalable object storage capability, although any storage architecture (or technology, technique, etc.) is contemplated. It should be noted that the components of operating environment 100 may interact via a network, which may be any type of wired or wireless network including a local area network (LAN), a wide area network (WAN), or a direct communication link, or other suitable connection.

A computing device 110 (e.g. server, desktop, laptop, tablet, smartphone, wearable device, etc.) may store data in the form of files (e.g. documents, multimedia files, binaries, etc.) that a user wishes to be backed-up. For example, each computing device 110 (or user) may subscribe to a backup service (BaaS) that provides the ability to recover such files in the event of data loss, hardware failure, viruses, etc. For example, computing device A may store a set of files (e.g. File A, and File B) that are backed-up to the cloud-based storage 150. However, other computing devices (e.g. computing devices B-D) may also store a copy of one or more of the set of files (e.g. File A and/or File B). For example, computing devices A-D may all be part of the same network (e.g. private network), and thus, there is a likelihood that one or more of the computing devices 110 store the same files. Accordingly, as part of a recovery process, the recovery manager 175 may recover files from a computing device 110 (e.g. peer device) as well as from the cloud-based storage 150. Thus, as shown in this example, computing device A may represent a target device (e.g. device to which files are recovered), and computing devices B, C, and D may represent source devices 1, 2, and 3, respectively (e.g. devices from which files are retrieved). In other words, recovery data (e.g. backup data and/or a copy of a particular file) may be retrieved from a combination of computing devices 110 and the cloud-based storage 150.

The cloud-based storage 150 may store recovery data in the form of backup files (or data) as part of a backup service. In general, the storage of backup files may be configured to store computing device 110 data backups that can be recovered (or restored) in the event of data loss. The term backup is intended to be construed broadly and includes, but is not limited to, partial backups, incremental backups, full backups, clones, snapshots, any other type of copies of data, and any combination of the foregoing. Any of the foregoing may, or may not, be deduplicated.

As shown, in some embodiments, the recovery data (or backup files) stored by the cloud-based storage 150 may be distributed amongst various storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs (e.g. cost/GB), performance costs (e.g. premium for expedited retrieval), etc. For instance, higher performance tiers may be associated with increased costs. As shown in this example, cloud-based storage 150 may include Storage Tier 1 151, which may be a standard (or high performance) storage tier that is associated with a first storage cost (or cost per unit of retrieval), and Storage Tier 2 151, which may be an archival or low-cost storage tier that is associated with a second storage cost (or cost per unit of retrieval). For example, the storage and/or retrieval costs associated with Storage Tier 2 152 may be lower than the storage and/or retrieval costs associated with Storage Tier 1 151. Thus, efficiently retrieving data from a lower tier storage may provide substantial cost savings to a subscriber (e.g. a backup service provider, or user) of a cloud-based storage service. The use of two storage tiers in 150 is for illustration only, and the cloud storage 150 may include more storage tiers. Moreover, the cloud storage tier may be distributed across multiple data centers, in the same region or in different regions, to provide different cost and availability attributes. Each such location may be associated with a different price and with different retrieval parameters (latency, throughput, etc.). Additionally, the cloud storage may comprise of a collection of cloud storage systems from different cloud service providers, with multiple copies of the same data, or different pieces of data, being stored on different cloud providers according to any predefined or dynamic policy.

The recovery manager 175 may interact with one or more computing devices 110 and the cloud-based storage 150 to perform a distributed recovery of files to a target device. To prioritize the retrieval of files from multiple sources (e.g. computing devices 110 and/or cloud-based storage 150), the system may store (or maintain, manage, etc.) various types of information that may be analyzed. As shown, such information may include computing device retrieval information 181, cloud-based storage retrieval information 182, and computing device target information 183. Such information may be used by the manager 175 to distribute the retrieval of recovery data as further described herein. To provide such functionality, the recovery manager 175 may coordinate (or manage, orchestrate, execute, automate, etc.) various operations (or processes, methods, etc.) to perform a recovery process. For example, the recovery manager 175 may direct (or control, initiate, etc.), or work in conjunction with, other components of the operating environment 100 to perform various operations as further described herein. In addition, the recovery manager 175 may provide an interface (e.g. application programming interface (API), graphical user interface (GUI), command line interface (CLI), etc.) that allows a user to configure various settings associated with performing a recovery process.

In some embodiments, at least some of the backup (or recovery) functionality provided a backup and recovery service (or platform) may be provided by a backup agent (not shown), which may be installed on, or remotely work in conjunction with (e.g. via a server), a computing device 110. For example, the backup agent (or client agent/component) may be an application (or process, daemon, etc.) that executes in the background of the operating system (OS) of a computing device 110. For instance, the backup agent may interact directly with components (e.g. tiers) of the cloud-based storage 150 (e.g. via an API) to perform various file operations such as reading, writing, moving files, etc. In some embodiments, as part of a backup process, the backup agent may continuously monitor and synchronize files stored on the computing device 110 with a backup copy stored on the cloud-based storage 150. For example, the backup agent may provide file usage information (e.g. statistics) that are maintained by the recovery manager 175 (e.g. as part of information 183). However, in some embodiments, the backup agent may be part of, or work in conjunction with, the recovery manager 175.

Accordingly, in some embodiments, components of the operating environment 100 may perform a retrieval of recovery data amongst multiple storage source types as further described with reference to FIG. 2.

Figure 2:
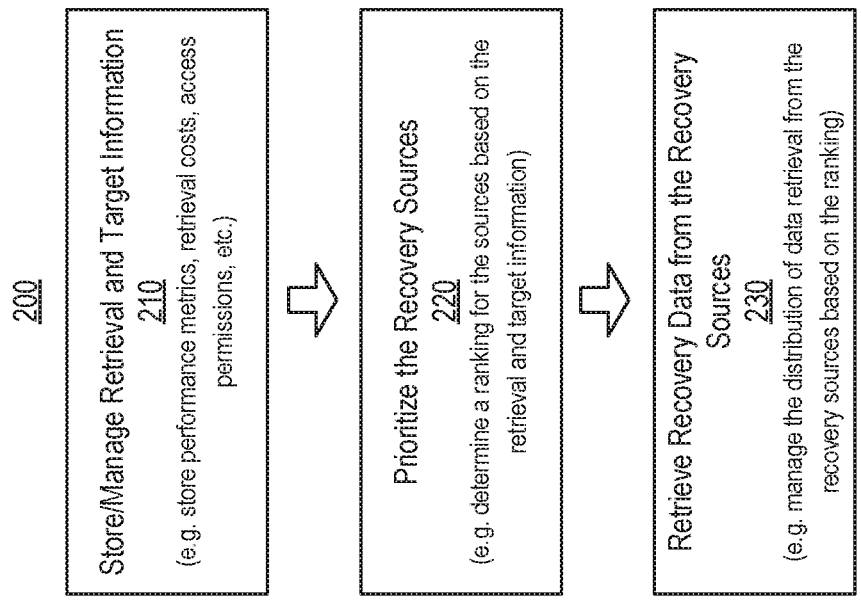
FIG. 2 is a diagram illustrating an example process flow overview of prioritizing the retrieval of recovery data stored amongst multiple storage source types according to one or more embodiments of the disclosure.

FIG. 2 is a block diagram 200 illustrating an example process flow for prioritizing the retrieval of recovery data stored amongst multiple storage source types according to one or more embodiments of the disclosure. In some embodiments, the process may be performed by a system (e.g. manager 175). In general, as part of a process to efficiently distribute the retrieval of recovery data from multiple sources, the system may analyze various types of information that is used to prioritize (or order, score, rank, etc.) the potential sources of recovery data.

Accordingly, as shown, in 210, the system may store retrieval and target information. The retrieval information may include various parameters, attributes, characteristics, etc. associated with the storage sources. The system may maintain a database storing the retrieval information and access the database as necessary, for example, as part of a recovery process. As described, the retrieval information may include information associated with peer devices (e.g. computing device retrieval information 181), and information associated with the cloud-based storage (e.g. cloud-based storage retrieval information 182). For example, the retrieval information associated with a peer device may include performance metrics, access permissions, availability parameters, and various other types of information, and the retrieval information associated with the cloud-based storage may include performance metrics, and costs associated with retrieving backup data. In other words, the retrieval information may be specific to all types of storage sources (e.g. cloud-based and peer devices), specific to the cloud-based storage, or specific to the peer devices.

Performance metrics may be stored for both peer devices and the cloud-based storage. A performance metric may include a metric for calculating the time (e.g. average time) to transfer data from a particular source, a transfer speed, initial access time, bandwidth, or other measures associated with the performance of retrieving data from a storage source. For example, a peer device that is part of the same private network as the computing device may have a better performance metric than the cloud-based storage that is accessed via a public network (e.g. Internet). As another example, retrieval from a standard or high performance storage tier would have a better performance metric than a low cost or archival storage tier of the cloud-based storage. In some embodiments, the performance metrics may include a historical average for retrieving data from a particular source. For example, after retrieving data from a storage source, the system may store various performance metrics used to calculate statistics for subsequent retrievals.

Cost information may be stored for various components (e.g. storage tiers) of the cloud-based storage. A cost may include a cost associated with the amount of data retrieved (e.g. cost/GB), the number of accesses (e.g. cost/1000 accesses), the performance of the retrieval (e.g. expedited, standard, bulk, etc.), or other factors. For instance, the system may determine that retrieving one or more files requires a certain amount of data (GBs), and accordingly, the system may determine a cost for retrieving the one or more files from the cloud-based storage. In some embodiments, the cost associated with retrieving the copy may also differ depending on the storage tier the recovery data resides. In addition, the cost may include a cost of retrieving the data from the cloud-based storage, and a cost for transferring the data to the target device.

Access permissions may specify which files, directories, drives, etc. may be accessed as part of a peer-to-peer recovery process. For example, a user may specify a "user documents" directory is not available to be accessed as a source for recovering data. For example, even if a particular computing device (e.g. computing device B) stores a copy of a particular file (e.g. File A) that is to be recovered for a particular target device (e.g. computing device A), if the file is stored within the "user documents" directory, the system may not use the file as a retrieval source. Accordingly, the system may instead retrieve the recovery data from another computing device (e.g. computing device C) that stores a copy of the particular file, or from the cloud-based storage 150 that stores a backup of the file.

In some embodiments, particular devices may be associated with one or more access permissions. For example, a particular devices (e.g. computing device B) may indicate that the device is not be accessed as part of a peer-to-peer recovery process. For example, a device may be associated with a certain employee (e.g. CEO), and therefore, have an access permission that prevents peer-to-peer recovery.

In some embodiments, the access permissions may be associated with a particular user. In other words, access permissions may be user-specific. For example, a computing device may be associated with multiple user accounts, and a particular user account (e.g. first user account) may specify a first set of access permissions for computing device B, and a different user (e.g. second user account) may specific a second, different, set of access permission for computing device B. For example, only devices associated with users having a certain security clearance may be accessed for recovery.

An availability parameter (or information) may specify when the device is available to be accessed for retrieval. For example, the availability parameter may include a schedule for which the device may be accessed for retrieval. For instance, the availability parameter may indicate that the device may only be accessed outside of business hours (e.g. 8 pm-5 am). As another example, the availability parameter may indicate a status or mode associated with the peer device that indicates when the device may be accessed. For example, the status or mode may include active, non-active, sleep or hibernate, online, offline, etc. For instance, the availability parameter may indicate that the device may be accessed for retrieval only when in a non-active (or sleep) mode.

Target information may include parameters associated with the target device or a file to be recovered (e.g. target file). The target information may include one or more recovery objectives. Recovery objectives may include a recovery time objective (RTO) associated with the target device and/or files, directories, users, drives, storage types, etc. In some embodiments, the recovery objective may include a threshold such as a maximum time allowed for recovery. However, unlike an access permission, in some embodiments, failing to satisfy a threshold may not eliminate a particular storage as a source, but rather decrease the associated ranking.

The target information may also include a recovery priority associated with a file to be recovered. For example, the recovery priority may be based on attributes (or parameters, characteristics, etc.) associated with the file. For example, the attribute may include various metadata associated with a file such as file type, author, file size, various dates or times such as a creation date, last modified date, last accessed date, etc., comments, tags, title, filename, etc. For example, the file type associated with the file may indicate the file is a user document, or critical system file, and accordingly, may have a high recovery priority. As another example, a file that has been accessed, created, saved, etc. within a predetermined time period (e.g. most recently) may have a higher recovery priority than files that have not been accessed as recently. Accordingly, in some embodiments, the recovery priority may be based on a usage statistic associated with each file. For example, the system may maintain such a usage statistic for each device-file pair. In some embodiments, the recovery priority may include a classification (e.g. low, medium, high), a score, or any other metric.

When managing the retrieval and target information, the information may be obtained (or stored) prior to initiating a particular recovery process. However, in some embodiments, the information, or related information, may be obtained after (or in response to) receiving a recovery request. For example, the system may determine some information in real-time such as the particular user account currently active on a particular computer device, or the status of a particular computing device (e.g. online, offline, sleep-mode, etc.). Accordingly, this real-time information may supplement information already stored by the system. For example, the system may determine a particular user account associated with a particular device to determine which files may be accessible for a recovery based on the access permissions defined for that particular user account.

In 220, the system may prioritize the recovery sources. In some embodiments, the system may rank each of the storage sources based on a determined retrieval score. For example, the system may determine retrieval scores based on a combination of retrieval information, target information, and other factors (e.g. characteristics, attributes, etc.). In some embodiments, the system may associate a weighting for each of the types of retrieval information used to determine the retrieval score. In addition, the system may adjust one or more of the weightings based on other types of retrieval information or target information. For example, if the system determines a particular file has a high recovery priority, the system may increase the weighting of the performance metric when determining a retrieval score for the storage sources. In some embodiments, the weightings may be assigned based on one or more predetermined configuration settings, or as an alternative to the predetermined weightings, the system may dynamically adjust the weightings based on real-time information obtained as part of the initiated recovery process.

In 230, the system may retrieve recovery data from the recovery sources. For example, the system may retrieve recovery data based on the rankings of the storage sources. In some embodiments, if one or more peer devices are ranked higher than the cloud-based storage, the system may concurrently (or simultaneously, at the same time, etc.) send a retrieval request to each of the peer devices as it may be presumed that not every peer device may be accessible for data retrieval. Accordingly, in some embodiments, based on the number of peer devices that accept the request, the system may then proceed to retrieve recovery data from particular peer devices based on the rankings. In addition, when retrieving the recovery data, the system may consider the resource consumption of particular sources and perform any necessary load balancing. For example, if a particular storage source has been used to transfer a certain amount of data (e.g. a threshold has been reached), the system may switch the retrieval to another source, or split the retrieval between multiple sources.

When performing a retrieval, the system may also perform a partial retrieval for certain files. For example, if a certain file to be recovered is rarely accessed, instead of retrieving the entire file, the system may retrieve the file on an on-demand basis from the storage source. For example, a placeholder file or indicator may be restored to the target device from retrieved metadata, and upon accessing the file (e.g. a user attempting to open the file), the system may commence retrieval of the recovery data (e.g. full file) from a particular storage source.

In some embodiments, once a retrieval is complete, the system may update stored data (e.g. performance metrics) associated with the recovery process. The system may then access the updated data to supplement subsequent (e.g. future) retrieval processes.

Accordingly, in some embodiments, the system may perform an intelligent retrieval of recovery data amongst multiple storage source types as further described with reference to FIG. 3.

Figure 3:
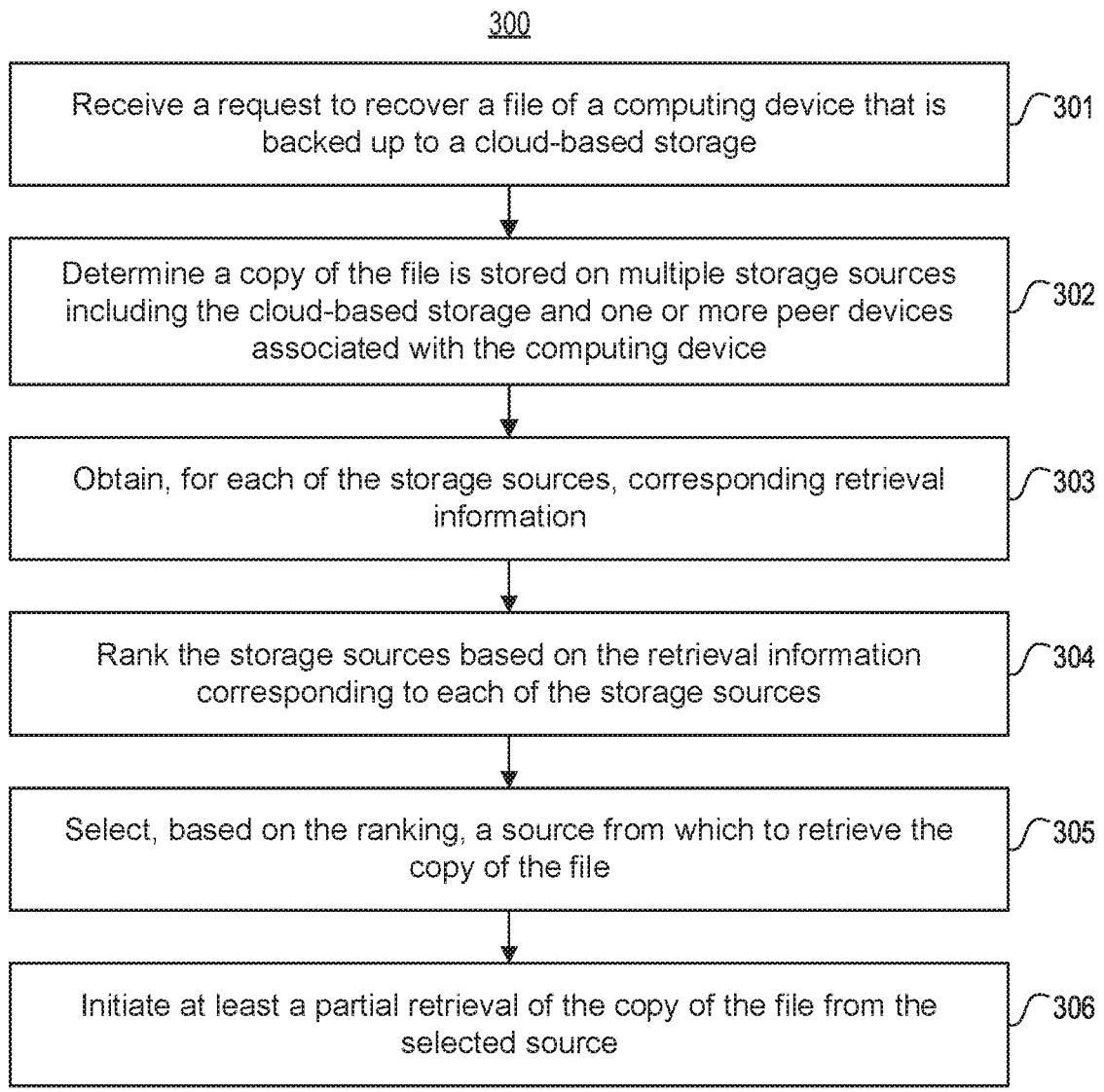
FIG. 3 is a flow diagram illustrating an example method of distributing the retrieval of recovery data from multiple sources according to one or more embodiments of the disclosure.

FIG. 3 is a flow diagram illustrating an example method of distributing the retrieval of recovery data from multiple sources according to one or more embodiments of the disclosure. Process 300 may use processing logic, which may include software, hardware, or a combination thereof. For example, process 300 may be performed by a system including one or more components described in operating environment 100.

In 301, the system may receive a request to recover a file of a computing device (e.g. computing device 110) that is backed up to a cloud-based storage (e.g. cloud-based storage system 150). For example, File A (or set of Files A) of computing device A (e.g. target device) may have been lost or damaged, and accordingly, computing device A may request to initiate a recovery process to recover File A that was backed up as part of backup service.

In 302, the system may determine a copy of the file (e.g. recovery data) is stored on multiple storage sources including the cloud-based storage and one or more peer devices (e.g. computing device 110) associated with the computing device. For example, File A may be stored within a cloud-based storage as part of the backup service, and in addition, the system may determine File A is also stored on one or more of computing devices B, C, or D (e.g. source devices) that are associated with computing device A. For example, a peer device associated with the computing device may include devices that are part of the same network (e.g. intranet) or grouping. In some embodiments, a set of devices may be grouped together based on an authorization (or security, privacy, etc.) attribute authorizing the set of devices to share data. For example, certain devices may adhere to certain privacy or data security controls, and thus, be included as part of the same security group. In some embodiments, the devices associated with the computing device, and the computing device itself, may form a peer-to-peer network (or P2P network).

When determining whether a copy of the file is stored on a particular storage source, the system may perform a search of a database. In some embodiments, the system may maintain a database that indexes files stored within the set of storage sources. For example, the database may index files by storing a fingerprint (e.g. hash value) of files and an associated storage location. For example, the system may search the database based on a fingerprint of File A, and determine that in addition to being stored on the cloud-based storage, File A is also stored on computing devices B and D.

In 303, the system may obtain, for each of the storage sources, corresponding retrieval information (e.g. retrieval information 181/182). For example, the system may maintain a database storing the retrieval information and access the database as necessary, for example, as part of a recovery process. In some embodiments, each storage source may be associated with particular retrieval information. For example, computing device B may be associated with different retrieval information than computing device C. In some embodiments, the retrieval information associated with a peer device may include performance metrics, access permissions, availability parameters, and various other types of information.

In some embodiments, the retrieval information associated with the peer devices and/or cloud-based storage may include a performance metric for retrieving the copy from the corresponding storage source. For example, the performance metric may include a metric for calculating the time (e.g. average time) to transfer data from a corresponding source.

In some embodiments, the retrieval information corresponding to the cloud-based storage may include a cost associated with retrieving the copy from the cloud-based storage. For example, a cost associated with retrieving data from the cloud-based storage may include a cost associated with the amount of data retrieved (e.g. cost/GB), the number of accesses (e.g. cost/1000 accesses), and the performance of the retrieval (e.g. expedited, standard, bulk, etc.). For instance, the system may determine that retrieving one or more files requires a certain amount of data (GB s), and accordingly, the system may determine a cost for retrieving the one or more files from the cloud-based storage. In some embodiments, the cost associated with retrieving the copy may also include determining a storage tier on which the recovery data resides. For example, the system may determine a first set (or subset) of the files are stored on a standard (or first) storage tier (e.g. storage tier 1 151), and therefore, associated with the first cost, and determine a second set (or subset) of files are stored on a low cost (or second) storage tier (e.g. storage tier 2 152), and therefore, associated with a second cost.

In some embodiments, the retrieval information corresponding to one or more of the peer devices may include one or more access permissions associated with retrieving the copy from the corresponding peer device. For example, each peer device may be associated with a set of access permissions that specify which files, directories, drives, etc. may be accessed as part of a peer-to-peer recovery process.

In some embodiments, the retrieval information corresponding to one or more of the peer devices may also include one or more availability parameters associated with the corresponding peer device. For example, each peer device may be associated with one or more availability parameters that specify when the device is available to be accessed for retrieval. In some embodiments, the availability parameter may include a schedule specifying when the device may be accessed for retrieval. In some embodiments, the availability parameter may include a status or mode associated with the peer device that specifies when the device may be accessed. For example, the status or mode may include active, non-active, sleep or hibernate, online, offline, etc. For instance, the availability parameter may indicate that the device may be accessed for retrieval only when online. In some embodiments, the availability parameter include attributes associated with a current resource usage of the device. For example, the availability parameter may specify that the device may be accessed when a CPU and/or memory usage is below a threshold (e.g. CPU usage less than 50%).

In 304, the system may rank the storage resources based on the retrieval information corresponding to each of the storage sources. For instance, continuing with the example above, the ranking (or ordering, prioritizing, etc.) may include device D, as the highest ranking, followed by device B, and then the cloud-based storage.

In some embodiments, the ranking may also be based on computing device target information (e.g. target information 183). Accordingly, in some embodiments, the ranking may be based on a combination of the retrieval information and the target information. For example, the target information may include various objectives associated with recovering files on the computing device. Accordingly, in some embodiments, the system may obtain a recovery objective associated with the computing device or the file, and the storage sources may be ranked based on whether the performance metric corresponding to each of the storage sources satisfies the recovery objective. For example, the recovery objective may include a recovery time objective (RTO) associated with the computing device. For instance, the particular computing device may have an RTO requirement for immediate recovery, and accordingly, the system may increase the rank (or prioritize) a high-performance storage tier of the cloud-based storage. In addition, an RTO may be associated with particular files (e.g. files to be recovered), directories, users, drives, storage types, etc. For example, the system may determine that the file to be recovered has an RTO that allows for delayed recovery, and accordingly, the system may increase the rank of a low-performance storage tier of the cloud-based storage.

In some embodiments, the target information may include a recovery priority. Accordingly, in some embodiments, the system may obtain a recovery priority associated with the file, and the storage sources may be ranked based on the recovery priority associated with the file. For example, the system may determine that the file to be recovered has a low recovery priority, and accordingly, the system may increase the rank of the peer devices or a low-performance storage tier of the cloud-based storage to minimize the cost for recovering the file.

In some embodiments, ranking the storage sources may include the system determining a retrieval score for each of the storage sources from the corresponding retrieval information. For example, the system may determine retrieval scores based on a combination of retrieval information, target information, or other factors. In some embodiments, the system may associate a weighting for each of the types of retrieval information used to determine the retrieval score. In addition, the system may adjust one or more of the weightings based on other types of retrieval information or target information. In some embodiments, the weightings may be assigned based on one or more predetermined configuration settings, or as an alternative to the predetermined weightings, the system may dynamically adjust the weightings based on real-time information obtained as part of the initiated recovery process. For example, if the system determines a particular file has a high recovery priority, the system may increase the weighting of the performance metric when determining a retrieval score for the storage sources. Likewise, if the system determines a particular file has a low recovery priority, the system may decrease the weighting of the performance metric when determining a retrieval score for the storage sources.

In 305, the system may select, based on the ranking, a source from which to retrieve the copy of the file (or recovery data). In some embodiments, the system may select the cloud-based storage as the source if the cloud-based storage is ranked higher than the peer devices. However, if one or more peer devices are ranked higher than the cloud device, the system may select a first peer device, amongst the peer devices that are ranked higher than the cloud-based storage, as the source. For example, if the cloud-based storage is ranked higher than computing devices B, and D, the system may proceed to retrieve File A from the cloud-based storage without using devices B, or D as retrieval sources. However, if the devices B, and D are ranked higher than the cloud-based storage, or exceed a certain threshold, the system may attempt to use devices B, or D as retrieval sources.

In some embodiments, selecting a first peer device may include sending, to each of the peer devices that are ranked higher than the cloud-based storage, a request to access the copy. Accordingly, the system may select, amongst the peer devices accepting the request to access the copy, a highest ranked peer device as the first device. For instance, continuing with the previous example, the system may send a request to access File A to each of devices B, and D (e.g. the devices that are ranked higher than the cloud-based storage), and if both devices accept the request, the system may select device D (e.g. the highest ranking device between devices B, and D). However, if only device B accepts the request, the system may instead select device B as the device from which to retrieve File A. In addition, in some embodiments, to improve recovery performance, the system may send the requests to each of the peer devices at substantially the same time (or simultaneously, concurrently, etc.).

In 306, the system initiate at least a partial retrieval of the copy from the selected source. For example, the system may commence retrieval of File A from device D. However, if there is an interruption during the retrieval of File A, the system may resume retrieval of the remaining portion of File A from a second storage source. In some embodiments, in the event of a retrieval interruption (or unavailability) of a peer device, the system may, as a default, switch (or transfer) retrieval to the cloud-based storage. Alternatively, the system may select another peer device. For example, the system may select the next highest ranking peer device (e.g. device B). As another example, the system may switch retrieval to the cloud-based storage after reaching a threshold for attempts to retrieve one or more files from a peer device. For example, after two interruptions (or retrieval failures) from a peer device, the system may proceed to retrieve the files from the cloud-based storage.

In some embodiments, the system may also perform partial recoveries of the copy from multiple storage sources simultaneously. For example, if File A (e.g. the file to be recovered) is associated with a high recovery priority or a certain RTO (e.g. low RTO), the system may simultaneously retrieve a first or initial portion (e.g. first half) of File A from device D, and a second or remaining portion (e.g. second half) of File A from device B.

The system may also manage retrieval based on resource consumption. For example, if a particular peer device has been burdened with providing a certain amount of retrieval data (e.g. a threshold has been reached), the system may redistribute the retrieval to another source. Accordingly, in some embodiments, the system may select a second peer device, amongst the peer devices that are ranked higher than the cloud-based storage, as the source, in response to determining a resource consumption associated with retrieving data from the first peer device is exceeded. For example, if a resource consumption associated with device D has been exceeded, the system may switch retrieval of File A to device B.

Accordingly, in some embodiments, the system allows for intelligently distributing the retrieval of recovery data amongst peer-based and cloud-based storage sources.

FIG. 4 shows a block diagram of an example of a computing system that may be used in conjunction with one or more embodiments of the disclosure. For example, computing system 400 (or system, or server, or computing device, or device) may represent any of the devices or systems (e.g. recovery manager 175, cloud-based storage system 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. recovery manager 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive a request to recover a file of a computing device that is backed up to a cloud-based storage in a cloud-based service environment;
determine a copy of the file is stored on multiple storage sources including the cloud-based storage and one or more peer computing devices associated with the computing device in a peer-to-peer network;

obtain, for each of the storage sources, corresponding retrieval information including at least a performance metric for retrieving the copy from the corresponding storage source;

rank the storage sources based on the retrieval information corresponding to each of the storage sources;

select, based on the ranking, a source from which to retrieve the copy including selecting the cloud-based storage as the source if the cloud-based storage is ranked higher than the peer computing devices, or selecting a first peer computing device, amongst the peer computing devices that are ranked higher than the cloud-based storage, as the source, wherein selecting the first peer computing device includes sending, to each of the peer computing devices that are ranked higher than the cloud-based storage, a request to access the copy, and selecting, amongst the peer computing devices accepting the request to access the copy, a highest ranked peer computing device as the first device; and initiate at least a partial retrieval of the copy from the selected source.

2. The system of claim 1, wherein sending the request to access the copy includes sending the requests to each of the peer devices at substantially the same time.

3. The system of claim 1, wherein the plurality of instructions, when executed, further cause the one or more processors to:

select a second peer device, amongst the peer devices that are ranked higher than the cloud-based storage, as the source, in response to determining a resource consumption associated with retrieving data from the first peer device is exceeded.

4. The system of claim 1, wherein the plurality of instructions, when executed, further cause the one or more processors to:

obtain a recovery objective associated with the computing device or the file; and wherein the storage sources are ranked based on whether the performance metric corresponding to each of the storage sources satisfies the recovery objective.

5. The system of claim 1, wherein the plurality of instructions, when executed, further cause the one or more processors to:

obtain a recovery priority associated with the file; and wherein the storage sources are ranked based on the recovery priority associated with the file.

6. The system of claim 1, wherein ranking the storage sources includes determining a retrieval score for each of the storage sources from the corresponding retrieval information.

7. The system of claim 1, wherein the retrieval information corresponding to the cloud-based storage includes a cost associated with retrieving the copy from the cloud-based storage.

8. The system of claim 1, wherein the retrieval information corresponding to one or more of the peer devices includes at least one of an access permission associated with retrieving the copy from the corresponding peer device, and an availability parameter associated with the corresponding peer device.

9. The system of claim 1, wherein at least some of the peer computing devices that accept the request to access the copy, accept the request based on a user account currently active on the peer computing device at a time of the request.

10. The system of claim 1, wherein at least some of the peer computing devices that accept the request to access the copy, accept the request based on an online status of the peer computing device at a time of the request.

11. A method of retrieving recovery data from multiple sources, comprising:

receiving a request to recover a file of a computing device that is backed up to a cloud-based storage in a cloud-based service environment;

determining a copy of the file is stored on multiple storage sources including the cloud-based storage and one or more peer computing devices associated with the computing device in a peer-to-peer network;

obtaining, for each of the storage sources, corresponding retrieval information including at least a performance metric for retrieving the copy from the corresponding storage source;

ranking the storage sources based on the retrieval information corresponding to each of the storage sources;

selecting, based on the ranking, a source from which to retrieve the copy including selecting the cloud-based storage as the source if the cloud-based storage is ranked higher than the peer computing devices, or selecting a first peer computing device, amongst the peer computing devices that are ranked higher than the cloud-based storage, as the source, wherein selecting the first peer computing device includes sending, to each of the peer computing devices that are ranked higher than the cloud-based storage, a request to access the copy, and selecting, amongst the peer computing devices accepting the request to access the copy, a highest ranked peer computing device as the first device; and initiating at least a partial retrieval of the copy from the selected source.

12. The method of claim 11, wherein sending the request to access the copy includes sending the requests to each of the peer devices at substantially the same time.

13. The method of claim 11, further comprising:

selecting a second peer device, amongst the peer devices that are ranked higher than the cloud-based storage, as the source, in response to determining a resource consumption associated with retrieving data from the first peer device is exceeded.

14. The method of claim 11, further comprising:

obtain a recovery objective associated with the computing device or the file; and wherein the storage sources are ranked based on whether the performance metric corresponding to each of the storage sources satisfies the recovery objective.

15. The method of claim 11, further comprising:

obtain a recovery priority associated with the file; and wherein the storage sources are ranked based on the recovery priority associated with the file.

16. The method of claim 11, wherein ranking the storage sources includes determining a retrieval score for each of the storage sources from the corresponding retrieval information.

17. A computer program product comprising a non-transitory computer-readable medium having a computer-readable program code embodied therein to be executed by one or more processors, the program code including instructions to:

receive a request to recover a file of a computing device that is backed up to a cloud-based storage in a cloud-based service environment;

determine a copy of the file is stored on multiple storage sources including the cloud-based storage and one or more peer computing devices associated with the computing device in a peer-to-peer network;

obtain, for each of the storage sources, corresponding retrieval information including at least a performance metric for retrieving the copy from the corresponding storage source;

rank the storage sources based on the retrieval information corresponding to each of the storage sources;

select, based on the ranking, a source from which to retrieve the copy including selecting the cloud-based storage as the source if the cloud-based storage is ranked higher than the peer computing devices, or selecting a first peer computing device, amongst the peer computing devices that are ranked higher than the cloud-based storage, as the source, wherein selecting the first peer computing device includes sending, to each of the peer computing devices that are ranked higher than the cloud-based storage, a request to access the copy, and selecting, amongst the peer computing devices accepting the request to access the copy, a highest ranked peer computing device as the first device; and initiate at least a partial retrieval of the copy from the selected source.

18. The computer program product of claim 17, wherein sending the request to access the copy includes sending the requests to each of the peer devices at substantially the same time.

19. The computer program product of claim 17, wherein the program code includes further instructions to:
select a second peer device, amongst the peer devices that are ranked higher than the cloud-based storage, as the source, in response to determining a resource consumption associated with retrieving data from the first peer device is exceeded.

20. The computer program product of claim 17, wherein the program code includes further instructions to:
obtain a recovery objective associated with the computing device or the file; and
wherein the storage sources are ranked based on whether the performance metric corresponding to each of the storage sources satisfies the recovery objective.

21. The computer program product of claim 17, wherein the program code includes further instructions to:
obtain a recovery priority associated with the file; and
wherein the storage sources are ranked based on the recovery priority associated with the file.

* * * * *